(12) United States Patent
Sugita et al.

(10) Patent No.: US 11,615,926 B2
(45) Date of Patent: Mar. 28, 2023

(54) METHOD AND DEVICE FOR PRODUCING PRESSURE SENSITIVE SENSOR

(71) Applicant: Hitachi Metals, Ltd., Tokyo (JP)

(72) Inventors: Keisuke Sugita, Tokyo (JP); Masahiro Abe, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 329 days.

(21) Appl. No.: 16/894,318

(22) Filed: Jun. 5, 2020

(65) Prior Publication Data

US 2020/0388449 A1 Dec. 10, 2020

(30) Foreign Application Priority Data

Jun. 10, 2019 (JP) .............................. JP2019-108118

(51) Int. Cl.
*G01L 1/00* (2006.01)
*H01H 11/00* (2006.01)

(52) U.S. Cl.
CPC ............. *H01H 11/00* (2013.01); *G01L 1/005* (2013.01); *E05Y 2800/455* (2013.01); *Y10T 29/49105* (2015.01)

(58) Field of Classification Search
CPC ............... G01L 1/005; E05Y 2800/455; Y10T 29/49105
See application file for complete search history.

(56) References Cited

U.S. PATENT DOCUMENTS 10,622,167 B2   4/2020   Sugita et al.
11,217,400 B2   1/2022   Sugita et al.
(Continued)

FOREIGN PATENT DOCUMENTS

JP      S63-228116 A    9/1988
JP      H01-286816 A    11/1989
(Continued)

OTHER PUBLICATIONS

Japanese Office Action, dated Jun. 7, 2022, in Japanese Application No. 2019-108118 and English Translation thereof.
Japanese Office Action, dated Sep. 27, 2022, in corresponding Japanese Application No. 2019-108118 and English Translation thereof.

*Primary Examiner* — Peter Dungba Vo
*Assistant Examiner* — Jose K Abraham
(74) *Attorney, Agent, or Firm* — McGinn I.P. Law Group, PLLC.

(57) ABSTRACT

A method configured to produce a pressure-sensitive sensor composed of a cylindrical-shape body including therein a hollow portion along a longitudinal direction of that sensor, and being made of an elastic electrical insulating member, and a plurality of electrode wires arranged helically along an inner peripheral surface of the cylindrical-shape body and arranged in such a manner as to have no contact with each other. The method includes, with an extruder with a head, extrusion-molding the cylindrical-shape body while running the plurality of electrode wires into that head in such a manner that a periphery of the plurality of electrode wires is coated with the cylindrical-shape body, and taking up the cylindrical-shape body and the plurality of electrode wires ejected from the extruder while rotating the cylindrical-shape body and the plurality of electrode wires in a circumferential direction of the sensor, to thereby helically arrange the plurality of electrode wires.

19 Claims, 8 Drawing Sheets

(56) References Cited

U.S. PATENT DOCUMENTS

| | | | | |
|---|---|---|---|---|
| 2003/0106377 A1* | 6/2003 | Ishihara | ............. | E05F 15/44 |
| | | | | 73/756 |
| 2004/0107758 A1* | 6/2004 | Mikami | ............. | B21C 37/045 |
| | | | | 72/224 |
| 2011/0169513 A1* | 7/2011 | Bolbocianu | ............. | E05F 15/443 |
| | | | | 324/705 |
| 2011/0185819 A1* | 8/2011 | Hattori | ............. | E05F 15/44 |
| | | | | 29/595 |
| 2012/0222296 A1* | 9/2012 | Miyamoto | ............. | E05F 15/443 |
| | | | | 29/825 |
| 2013/0333488 A1* | 12/2013 | Ishihara | ............. | E05F 15/44 |
| | | | | 73/862.621 |
| 2016/0209278 A1* | 7/2016 | Hus | ............. | G01L 1/005 |
| 2018/0182570 A1 | 6/2018 | Sugita et al. | | |
| 2018/0364387 A1* | 12/2018 | Hattori | ............. | G01V 3/02 |
| 2020/0203091 A1 | 6/2020 | Sugita et al. | | |

FOREIGN PATENT DOCUMENTS

| | | | | |
|---|---|---|---|---|
| JP | H02-38029 A | | 2/1990 | |
| JP | H10-109347 A | | 4/1998 | |
| JP | H10-281906 A | | 10/1998 | |
| JP | 2012091358 A | * | 5/2012 | ............. E05F 15/44 |
| JP | 2017009531 A | * | 1/2017 | |
| JP | 2017026440 A | * | 2/2017 | |
| JP | 2018-105816 A | | 7/2018 | |

\* cited by examiner

METHOD AND DEVICE FOR PRODUCING PRESSURE SENSITIVE SENSOR

CROSS-REFERENCE TO RELATED APPLICATION

The present application is based on Japanese patent application No. 2019-108118 filed on Jun. 10, 2019, the entire contents of which are incorporated herein by reference.

BACKGROUND OF THE INVENTION

1. Field of the Invention

The present invention relates to a method and a device for producing a pressure sensitive sensor.

2. Description of the Related Art

Conventionally, a pressure sensitive sensor configured to function as a switch by contact between electrode wires with a pressure applied thereto from outside is used in a sliding door for an automobile, or the like (see, e.g., JP-A-10-281906).

The pressure sensitive sensor is configured to include a cylindrical shape elastic electrical insulating member including therein a hollow portion, and a plurality of electrode wires helically arranged on an inner peripheral surface of that elastic electrical insulating member in such a manner as to be spaced apart from each other. By appropriately adjusting the helical pitches of the plurality of electrode wires, even when applying the pressing force from any direction, it is possible to bring the plurality of electrode wires into contact with each other, and it is therefore possible to sense the pressing force in all the directions.

In a conventional method of producing the pressure sensitive sensor, a spacer (a dummy wire) and the plurality of electrode wires are twisted together, and a periphery thereof is coated with the elastic electrical insulating member, followed by pulling and removing the spacer.

[Patent Document 1] JP-A-10-281906

SUMMARY OF THE INVENTION

In the conventional pressure sensitive sensor producing method, the step of producing the spacer and the step of pulling and removing the spacer are indispensable, leading to the production being time-consuming.

Accordingly, it is an object of the present invention to provide a method and a device for producing a pressure sensitive sensor that are configured to make the production thereof easy.

For the purpose of solving the above-described problem, the present invention provides a pressure sensitive sensor producing method, which is configured to produce a pressure sensitive sensor composed of a cylindrical shape body including therein a hollow portion along a longitudinal direction of the pressure sensitive sensor, and being made of an elastic electrical insulating member, and a plurality of electrode wires arranged in a helical shape along an inner peripheral surface of the cylindrical shape body and arranged in such a manner as to have no contact with each other, the method comprising: with an extruding machine with a head, extrusion molding the cylindrical shape body while running the plurality of electrode wires into that head in such a manner that a periphery of the plurality of electrode wires is coated with the cylindrical shape body; and taking up the cylindrical shape body and the plurality of electrode wires ejected from the extruding machine while rotating the cylindrical shape body and the plurality of electrode wires in a circumferential direction of the pressure sensitive sensor, to thereby arrange the plurality of electrode wires into the helical shape.

Further, for the purpose of solving the above problem, the present invention provides a pressure sensitive sensor producing device, which is configured to produce a pressure sensitive sensor composed of a cylindrical shape body including therein a hollow portion along a longitudinal direction of the pressure sensitive sensor, and being made of an elastic electrical insulating member, and a plurality of electrode wires arranged in a helical shape along an inner peripheral surface of the cylindrical shape body and arranged in such a manner as to have no contact with each other, the device comprising: an extruding machine with a head configured to extrusion mold the cylindrical shape body while running the plurality of electrode wires into that head in such a manner that a periphery of the plurality of electrode wires is coated with the cylindrical shape body; and a take-up machine configured to take up the cylindrical shape body and the plurality of electrode wires ejected from the extruding machine while rotating the cylindrical shape body and the plurality of electrode wires in a circumferential direction of the pressure sensitive sensor.

Points of the Invention

According to the present invention, it is possible to provide the method and the device for producing the pressure sensitive sensor that are configured to make the production thereof easy.

DETAILED DESCRIPTION OF THE PREFERRED EMBODIMENTS

Embodiment

An embodiment of the present invention will be described below in conjunction with the accompanying drawing.

(Pressure Sensitive Sensor)

Figure 1A:
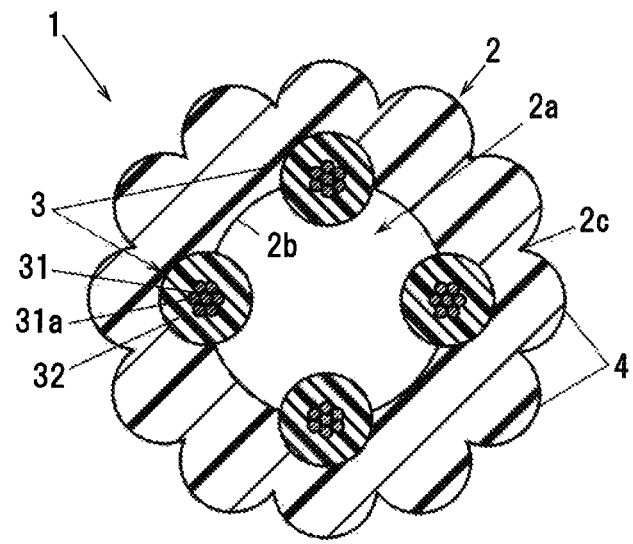
FIG. 1A is a cut portion end face view showing a part of an end face cut along a plane perpendicular to a longitudinal direction, of a pressure sensitive sensor according to one embodiment of the present invention.

First, a pressure sensitive sensor produced in the present embodiment will be described. FIG. 1A is a cut portion end face view showing a part of an end face cut along a plane perpendicular to a longitudinal direction, of the pressure sensitive sensor according to according to the present embodiment, and FIG. 1B is a perspective view showing the pressure sensitive sensor.

Figure 1B:
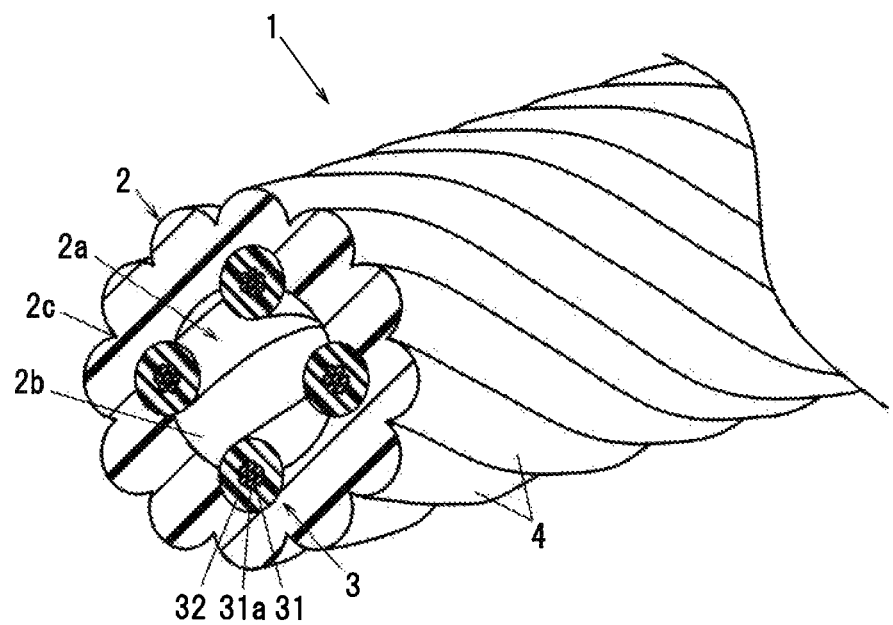
FIG. 1B is a perspective view showing the pressure sensitive sensor.

As shown in FIGS. 1A and 1B, the pressure sensitive sensor 1 is being configured to include a cylindrical shape body 2 including therein a hollow portion 2a along the longitudinal direction of the pressure sensitive sensor 1, and being made of an elastic electrical insulating member, and a plurality of electrode wires 3, which are being arranged in a helical shape along an inner peripheral surface 2b of the cylindrical shape body 2, and being arranged in such a manner as to have no contact with each other.

For the elastic electrical insulating member to be used in the cylindrical shape body 2, it is desirable to use the elastic electrical insulating member being small in compression set and excellent in flexibility, cold resistance, water resistance, chemical resistance, weather resistance and the like. Specifically, examples of the elastic electrical insulating member to be able to be suitably used include a rubber-based composition produced by crosslinking an ethylene-propylene-diene copolymer, or an olefin-based or styrene-based thermoplastic elastomer composition, or the like. Since the molding of the olefin-based or styrene-based thermoplastic elastomer requires no cross-linking, the olefin-based or styrene-based thermoplastic elastomer is able to make the production process simpler and the production cost lower than when a material whose molding requires the cross-linking is used. The outer diameter of the cylindrical shape body 2 is, for example, not smaller than 4 mm and not larger than 6 mm.

The styrene-based thermoplastic elastomer refers to a thermoplastic elastomer having styrene blocks at both ends of its molecule. Examples of the styrene-based thermoplastic elastomer include a SEBS (styrene-ethylene-butylene-styrene block copolymer) having styrene blocks at both ends of an EB (ethylene-butylene), a SEPS (styrene-ethylene-propylene-styrene block copolymer) having styrene blocks at both ends of an EP (ethylene-propylene), or a SEEPS (styrene-ethylene-ethylene-propylene-styrene block copolymer) having styrene blocks at both ends of an EEP (ethylene-ethylene-propylene).

A plurality of ribs 4 are being provided on an outer peripheral surface 2c of the cylindrical shape body 2 in such a manner as to project outward in radial directions of the cylindrical shape body 2. In the present embodiment, the plurality of ribs 4 of the cylindrical shape body 2 are being formed in such a manner as to be of a substantially semi-circular shape in a cross-sectional view perpendicular to the longitudinal direction of the pressure sensitive sensor 1. Further, the plurality of ribs 4 of the cylindrical shape body 2 are being provided at equal intervals in a circumferential direction of the pressure sensitive sensor 1, while being provided in a helical shape along the outer peripheral surface 2c of the cylindrical shape body 2. As will be described later in detail, the plurality of ribs 4 of the cylindrical shape body 2 are being formed in order to facilitate rotation (torsion) of the cylindrical shape body 2 in the circumferential direction of the pressure sensitive sensor 1. Note that, although in FIGS. 1A and 1B is shown a case in which the number of the ribs 4 of the cylindrical shape body 2 is 12, the number of the ribs 4 of the cylindrical shape body 2 is not limited to the above number, but may be 3 or more. It should be noted, however, that, because if the number of the ribs 4 of the cylindrical shape body 2 is too large, there is concern that the grooves between the plurality of ribs 4 may become shallow leading to difficulty in the torsion of the cylindrical shape body 2, it is desirable to set the number of the ribs 4 of the cylindrical shape body 2, depending on the outer diameter of the cylindrical shape body 2, for example, set the number of the ribs 4 at not larger than 20 when the outer diameter of the cylindrical shape body 2 is 6 mm or smaller. The plurality of ribs 4 are a part of the cylindrical shape body 2 and are made of the elastic electrical insulating member.

The plurality of electrode wires 3 are each being constructed by coating a periphery of a respective conductor 31 with a respective elastic electrical conducting member 32. In the present embodiment, a case in which four of the electrode wires 3 are used will be described, but the number of the electrode wires 3 may be two or more. The four electrode wires 3 are provided at equal intervals in the circumferential direction of the pressure sensitive sensor 1, while being arranged in a helical shape along the inner peripheral surface 2b of the cylindrical shape body 2. By the four electrode wires 3 being arranged in a helical shape, even when the external pressure is applied thereto from various directions, the four electrode wires 3 are easily brought into contact with each other, and therefore the detection sensitivity of the pressure sensitive sensor 1 is enhanced.

For the constituent conductors 31 of the four electrode wires 3, it is possible to use, for example, a solid wire conductor made of a metal having a good electrical conductivity such as a copper or the like, or a stranded wire conductor composed of a plurality of wires 31a stranded together. Herein, the stranded wire conductor composed of seven of the wires 31a stranded together is being used for the constituent conductors 31 of the four electrode wires 3. The surfaces of the constituent conductors 31 of the four electrode wires 3 may be subjected to a plating with tin, nickel, silver, zinc or the like, for the purpose of making the heat resistance thereof high. Note that, for the constituent conductors 31 of the four electrode wires 3, it is also possible to use a copper foil yarn produced by wrapping a copper foil onto a yarn made of polyester or the like.

For the constituent elastic electrical conducting members 32 of the four electrode wires 3, it is possible to use the elastic electrical conducting member produced by compounding an electroconductive filler of a carbon or the like into a rubber material or an elastic plastic material. For the rubber material or the elastic plastic material to be used in the constituent elastic electrical conducting members 32 of the four electrode wires 3, it is possible to suitably use a rubber-based composition produced by crosslinking an ethylene-propylene-diene copolymer, or an olefin-based or styrene-based thermoplastic elastomer composition whose molding requires no crosslinking step, or the like.

The carbon to be used as the electroconductive filler for the constituent elastic electrical conducting members 32 of the four electrode wires 3 is preferably a particulate carbon such as carbon black or the like. If the carbon of a shape other than the particulate shape, such as a linear shape or a planar shape, is used, there is concern that the magnitudes of the electric resistances of the constituent elastic electrical conducting members 32 of the four electrode wires 3 may be varied, depending on the direction, leading to an adverse effect on the operation of the pressure sensitive sensor 1. Herein, the carbon black is the fine particulate carbon of on the order of 3 to 500 nm in diameter produced by incomplete combustion or the like of an oil or a gas. In particular, the electroconductive carbon black having a developed structure called a structure with primary carbon particles joined together therein is preferable.

In the pressure sensitive sensor 1, when a pressure is applied thereto from the outside, the cylindrical shape body 2 is elastically deformed, to allow a contact (a short circuit) between any two electrode wires 3 of a plurality (in the present embodiment, four) of the electrode wires 3. By detecting the contact between the electrode wires 3 with a sensing device (not shown), it is possible to sense the application of the pressure from the outside to the pressure sensitive sensor 1. The pressure sensitive sensor 1 can be used in, for example, anti-pinch applications, such as an automobile sliding door, an automobile hatch type rear door, an automobile power window, an elevator, a window shutter, an automatic door, platform screen doors, and the like.

(Pressure Sensitive Sensor Producing Device)

Figure 2:
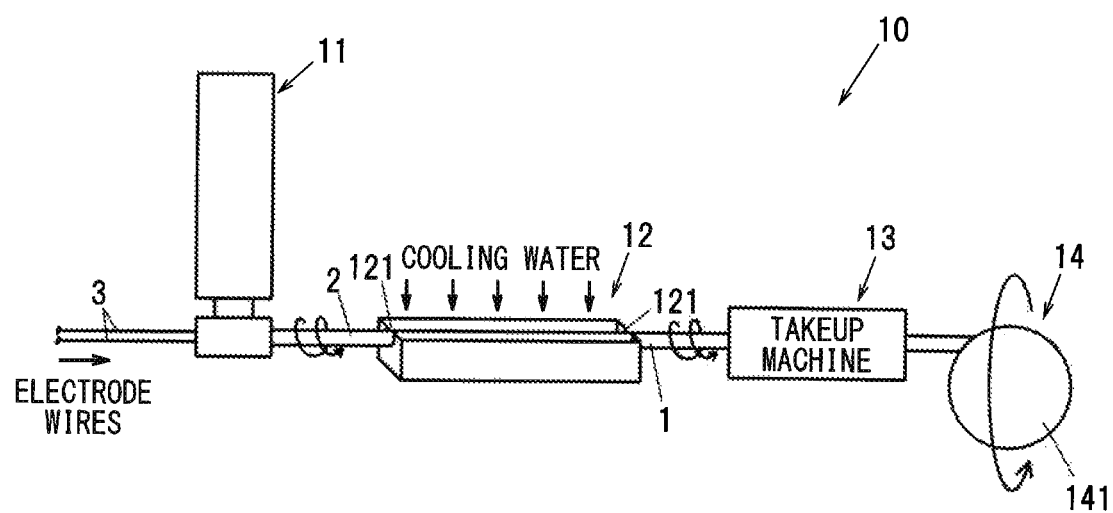
FIG. 2 is a schematic configuration diagram showing a pressure sensitive sensor producing device according to one embodiment of the present invention.

FIG. 2 is a schematic configuration diagram showing a producing device for the pressure sensitive sensor 1. As shown in FIG. 2, the pressure sensitive sensor producing device 10 is being configured to include an extruding machine 11, a water tank 12, a take-up machine 13, and a winding machine 14.

Figure 3A:
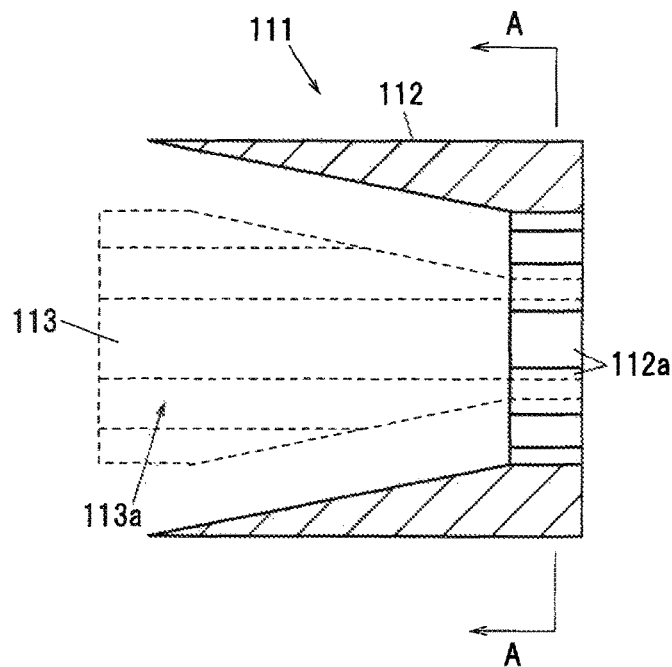
FIG. 3A is a cross-sectional view showing a die and a mandrel used in a head of an extruding machine.

The extruding machine 11 is the one configured to extrusion mold the cylindrical shape body 2 of the pressure sensitive sensor 1 in such a manner that a periphery of a plurality (herein, four) of the electrode wires 3 is coated with the cylindrical shape body 2. In the present embodiment, for the extruding machine 11, a cross-head type extruding machine with a head (cross head) 111 as shown in FIG. 3A is being used, and the cylindrical shape body 2 of the pressure sensitive sensor 1 is extrusion molded by extruding a resin (a molten elastic electrical insulating material) into a tubular shape around a periphery of a plurality (herein, four) of the electrode wires 3 while running the plurality (herein, four) of the electrode wires 3 into the head (cross head) 111 of the extruding machine 11. The four electrode wires 3 are fusion bonded and fixed to the inner peripheral surface 2b of the cylindrical shape body 2.

Figure 3B:
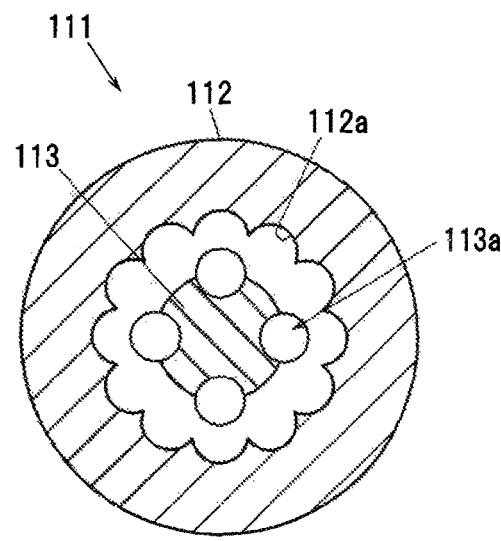
FIG. 3B is a cross-sectional view taken along line A-A in FIG. 3A.

As shown in FIGS. 3A and 3B, in the extruding machine 11, the resin (the molten elastic electrical insulating material) passes through a space 114 formed between a die 112 of the head 111 and a mandrel 113, whereby the cylindrical shape body 2 of the pressure sensitive sensor 1 is extrusion molded. Note that, in FIG. 3A, the mandrel 113 is indicated by a broken line. In the present embodiment, an inner peripheral surface of an ejecting side end portion of the die 112 is being formed with a plurality of grooves 112a thereon to thereby form the plurality of ribs 4 on the outer peripheral surface 2c of the cylindrical shape body 2.

The shapes of the plurality of ribs 4 of the cylindrical shape body 2 can be altered by appropriately altering the shapes of the plurality of grooves 112a of the die 112.

A tip portion of the mandrel 113 is being formed in a circular shape when viewed from the front (when viewed from the ejecting side), whereby the cylindrical shape body 2 having the circular shape hollow portion 2a in the cross-sectional view is extrusion molded. The mandrel 113 is being formed with four electrode wire insertion passages 113a through which the four electrode wires 3 respectively are passed, and the extrusion molding of the cylindrical shape body 2 is performed while running the four electrode wires 3 into the four electrode wire insertion passages 113a respectively, to thereby form the cylindrical shape body 2 so that the periphery of the four electrode wires 3 is coated with the cylindrical shape body 2. Note that a compressed gas may be introduced into the hollow portion 2a of the cylindrical shape body 2 in order to prevent the arrangement and shape of the cylindrical shape body 2 and the four electrode wires 3 from collapsing. In this case, for example, a middle portion of the mandrel 113 in the front view is provided with one or more holes therein passing through the mandrel 113 from the resin ejecting side of the mandrel 113 to the opposite side to that ejecting side, to thereby be able to feed the compressed gas from those holes located on the opposite side to the resin ejecting side. For the compressed gas to be used at this point of time, an inert gas such as air or nitrogen or the like is suitable.

Figure 3C:
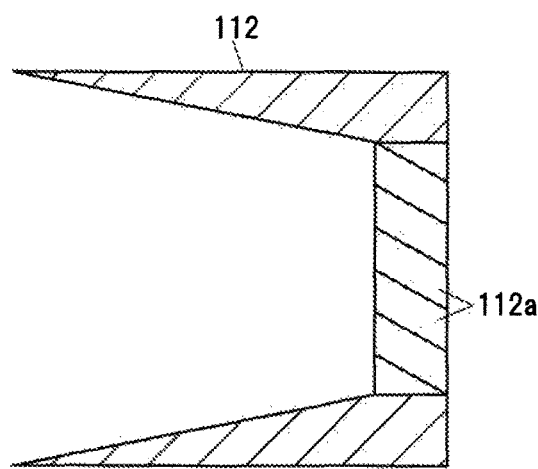
FIG. 3C is a cross-sectional view showing one modification to the die.

In the present embodiment, the plurality of grooves 112a of the die 112 are being formed parallel to the extruding direction (the resin ejecting direction). Note that the formation of the plurality of grooves 112a of the die 112 is not limited to the foregoing, but that, as shown in FIG. 3C, the plurality of grooves 112a of the die 112 may be formed in such a manner as to be inclined with respect to the extrusion direction (the resin ejecting direction). This allows the resin introduced into the plurality of grooves 112a of the die 112 to flow in a helical shape along the plurality of grooves 112a, and therefore be ejected while being rotated in a circumferential direction under the influence of the resin flowing in the plurality of grooves 112a. Note that the circumferential direction mentioned here refers to the circumferential direction of the cylindrical shape body 2 (or the pressure sensitive sensor 1) to be ejected. Although will be described in detail later, in the present embodiment, the four electrode wires 3 are arranged in a helical shape by the pressure sensitive sensor 1 being taken up while being rotated in the circumferential direction thereof in the take-up machine 13, but the formation of the plurality of grooves 112a of the die 112 in such a manner as to be inclined with respect to the extrusion direction aids in the rotation of the pressure sensitive sensor 1 with the take-up machine 13, and thereby makes it possible to suppress the load due to the rotation acting on the cylindrical shape body 2 at the exit of the head 111 of the extruding machine 11. It should be noted, however, that, when the plurality of grooves 112a of the die 112 are being formed in such a manner as to be inclined with respect to the extrusion direction, the direction in which the pressure sensitive sensor 1 is rotated, that is, the rotation direction of the pressure sensitive sensor 1 in arranging the four electrode wires 3 in a helical shape, is determined by the direction of the inclination of the plurality of grooves 112a. By forming the plurality of grooves 112a of the die 112 parallel to the extrusion direction, it is possible to appropriately alter the rotation direction of the pressure sensitive sensor 1 in the take-up machine 13, and it is therefore possible to appropriately alter the rotation direction of the pressure sensitive sensor 1 in arranging the four electrode wires 3 in a helical shape.

The water tank 12 is the one configured to cool the cylindrical shape body 2. The cylindrical shape body 2 and the four electrode wires 3 ejected from the head 111 of the extruding machine 11 is extending to the take-up machine 13 in a substantially straight line shape, though slightly sagging under its own weight. The water tank 12 is being formed in a substantially rectangular cuboid shape being open upward, and has notch shape insertion passages 121 being open upward at opposite side walls in the longitudinal direction of that water tank 12. By feeding cooling water into the water tank 12 from above the water tank 12 while inserting into and passing through the insertion passages 121 of the water tank 12 the cylindrical shape body 2 and the four electrode wires 3, the cylindrical shape body 2 is cooled and solidified, resulting in the pressure sensitive sensor 1. Note that a roller and the like configured to support the pressure sensitive sensor 1 from below may be provided within the water tank 12 or adjacent to the water tank 12 in order to suppress the deflection of the pressure sensitive sensor 1 under its own weight.

The take-up machine 13 is the one configured to take up the pressure sensitive sensor 1 at a constant speed. The take-up machine 13 will be described in detail later. The winding machine 14 is the one configured to wind the pressure sensitive sensor 1 taken up by the take-up machine 13 onto a bobbin 141.

(Take-Up Machine 13)

In the pressure sensitive sensor producing device 10 according to the present embodiment, the take-up machine 13 is being configured in such a manner as to take up the cylindrical shape body 2 and the four electrode wires 3 (the pressure sensitive sensor 1 having been passed through the water tank 12) having been ejected from the extruding machine 11 while rotating the cylindrical shape body 2 and the four electrode wires 3 in the circumferential direction of the pressure sensitive sensor 1, to thereby arrange the four electrode wires 3 into a helical shape. By rotating the cylindrical shape body 2 and the four electrode wires 3 in the circumferential direction of the pressure sensitive sensor 1 with the take-up machine 13, the cylindrical shape body 2 immediately after being ejected from the head 111 of the extruding machine 11 (before being cooled in the water tank 12) is subjected to torsion, while the four electrode wires 3 are arranged in a helical shape. The cylindrical shape body 2 remaining in the torsional state is introduced into the water tank 12, where the cylindrical shape body 2 is cooled and solidified while remaining in the torsional state. This allows the four electrode wires 3 to be maintained in the helical shape arranged state. This results in the pressure sensitive sensor 1.

Figure 4:
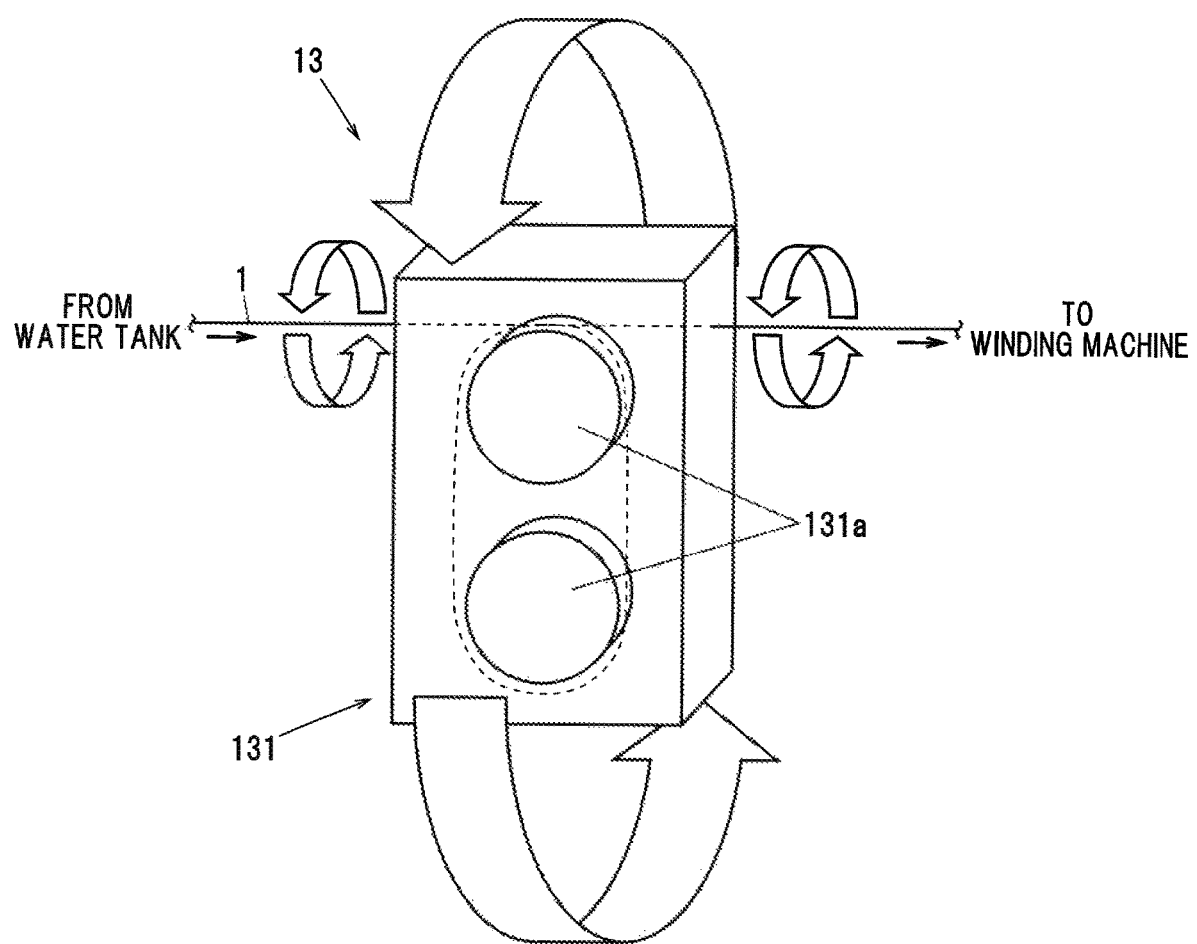
FIG. 4 is a diagram showing a capstan type take-up machine.

For the take-up machine 13, it is possible to use, for example, a capstan type take-up machine 131 as shown in FIG. 4. The capstan type take-up machine 131 is being configured to include a plurality (herein two) of capstans 131a therein, to wind the pressure sensitive sensor 1 onto those capstans 131a, rotate those capstans 131a, and thereby perform the taking up of the pressure sensitive sensor 1. When the capstan type take-up machine 131 is used, the taking up of the pressure sensitive sensor 1 is performed while rotating the whole of that capstan type take-up machine 131 in the circumferential direction of the pressure sensitive sensor 1 to be introduced into that capstan type take-up machine 131, so that the pressure sensitive sensor 1 can thereby be taken up while being rotated in the circumferential direction of the pressure sensitive sensor 1. In this case, the helical pitches of the four electrode wires 3 can be adjusted by adjusting the taking up speed (the rotation speed of the two capstans 131a), and the rotation speed of the capstan type take-up machine 131 in rotating the whole of that capstan type take-up machine 131.

Figure 5A:
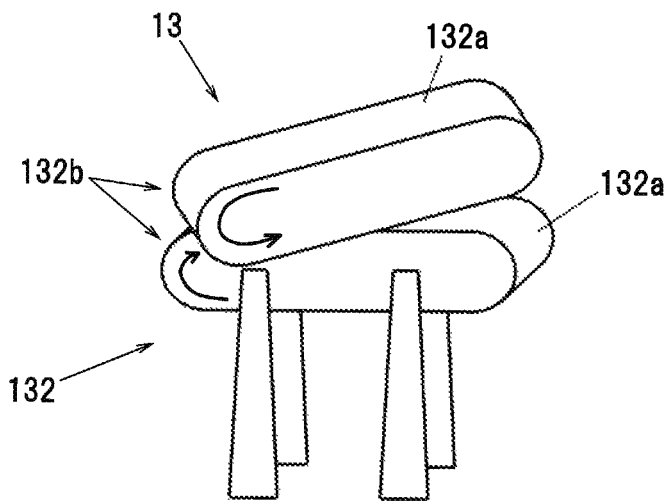
FIG. 5A is a perspective view showing a belt type take-up machine.
Figure 5B:
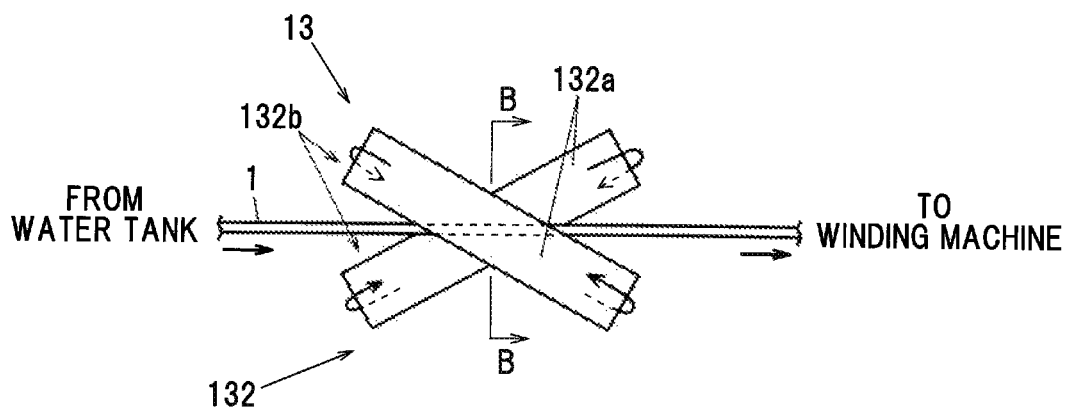
FIG. 5B is a top view showing that belt type take-up machine.
Figure 5C:
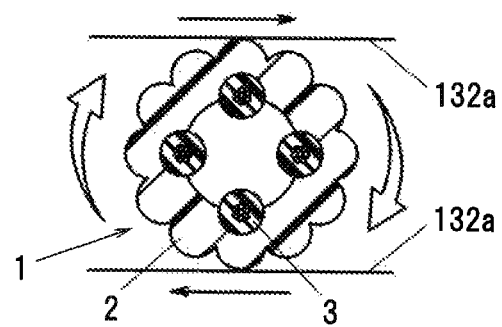
FIG. 5C is a diagram for explaining a behavior of the pressure sensitive sensor at a cross section taken along line B-B in FIG. 5B.

Further, for the take-up machine 13, it is also possible to use a belt type (or caterpillar type) take-up machine 132 as shown in FIGS. 5A to 5C. The belt type take-up machine 132 is being configured to include one pair of belt rotating mechanisms 132b with upper and lower ring shape belts 132a to be rotationally driven therein, to sandwich the pressure sensitive sensor 1 between the upper and lower ring shape belts 132a with the one pair of belt rotating mechanisms 132b, rotate the upper and lower ring shape belts 132a of the one pair of belt rotating mechanisms 132b, and thereby perform the taking up of the pressure sensitive sensor 1. In the present embodiment, the belt type take-up machine 132 is being configured in such a manner that the taking up of the pressure sensitive sensor 1 is performed by arranging the one pair of belt rotating mechanisms 132b in such a manner as to allow the rotating directions of the upper and lower ring shape belts 132a in the one pair of belt rotating mechanisms 132b to intersect with each other, to thereby take up the pressure sensitive sensor 1 while rotating the pressure sensitive sensor 1 in the circumferential direction of the pressure sensitive sensor 1.

More specifically, as shown in FIG. 5B, of the one pair of belt rotating mechanisms 132b, one belt rotating mechanism 132b is arranged in such a manner that the rotation direction of its ring shape belt 132a is inclined at a predetermined angle with respect to the longitudinal direction of the pressure sensitive sensor 1, while the other belt rotating mechanism 132b is arranged in such a manner that the rotation direction of its ring shape belt 132a is inclined to the opposite side to the one belt rotating mechanism 132b by a predetermined angle with respect to the longitudinal direction of the pressure sensitive sensor 1. The one pair of belt rotating mechanisms 132b are arranged in such a manner as to have a rotational symmetry of 180 degrees with respect to the central axis of the pressure sensitive sensor 1. In order to prevent the pressure sensitive sensor 1 from slipping on the upper and lower ring shape belts 132a when rotating the upper and lower ring shape belts 132a, the distance between the one pair of belt rotating mechanisms 132b may be set at smaller than the outer diameter of the pressure sensitive sensor 1 (for example, at on the order of 90% of the outer diameter of the pressure sensitive sensor 1).

When in this condition the upper and lower ring shape belts 132a of the one pair of belt rotating mechanisms 132b are rotated at the same speed, as shown in FIG. 5C, a resulting force, which rotates the pressure sensitive sensor 1 in the circumferential direction of the pressure sensitive sensor 1, and a resulting force (not shown), which pulls the pressure sensitive sensor 1 in the longitudinal direction of the pressure sensitive sensor 1, are applied by the upper and lower ring shape belts 132a to the pressure sensitive sensor 1, thereby making it possible to take up the pressure sensitive sensor 1 while rotating the pressure sensitive sensor 1 in the circumferential direction of the pressure sensitive sensor 1. With the belt type take-up machine 132, the helical pitches of the four electrode wires 3 can be adjusted by appropriately altering the angles of the rotation directions of the upper and lower ring shape belts 132a with respect to the longitudinal direction of the pressure sensitive sensor 1, or the rotation speed of the upper and lower ring shape belts 132a. The capstan type take-up machine 131 of FIG. 4 becomes a large-scale device because the whole of that capstan type take-up machine 131 is required to be rotated, whereas the belt type take-up machine 132 can more easily be configured because no rotation of the whole of that belt type take-up machine 132 is required.

It is desirable that the distance between the extruding machine 11 and the take-up machine 13 is as short as possible. This is because if the distance between the extruding machine 11 and the take-up machine 13 is long, the force (torsional force) for rotating the pressure sensitive sensor 1 with the take-up machine 13 is difficult to transmit to the vicinity of the extruding machine 11.

Note that, in the present embodiment, since the pressure sensitive sensor 1 is taken up while being rotated in the circumferential direction of the pressure sensitive sensor 1 in the take-up machine 13, the pressure sensitive sensor 1 guided out from the take-up machine 13 is also being rotated in the circumferential direction of the pressure sensitive sensor 1. For that reason, the winding machine 14 may be configured in such a manner as to wind the pressure sensitive sensor 1 onto the bobbin 141 while allowing the bobbin 141 to be rotated in synchronization with the rotation of the pressure sensitive sensor 1. That is, in the winding machine 14, the winding of the pressure sensitive sensor 1 onto the bobbin 141 may be performed while the bobbin 141 is being rotated in the same rotation direction as the rotation direction of the pressure sensitive sensor 1 and at the same rotation speed as the rotation speed of the pressure sensitive sensor 1.

Figure 6:
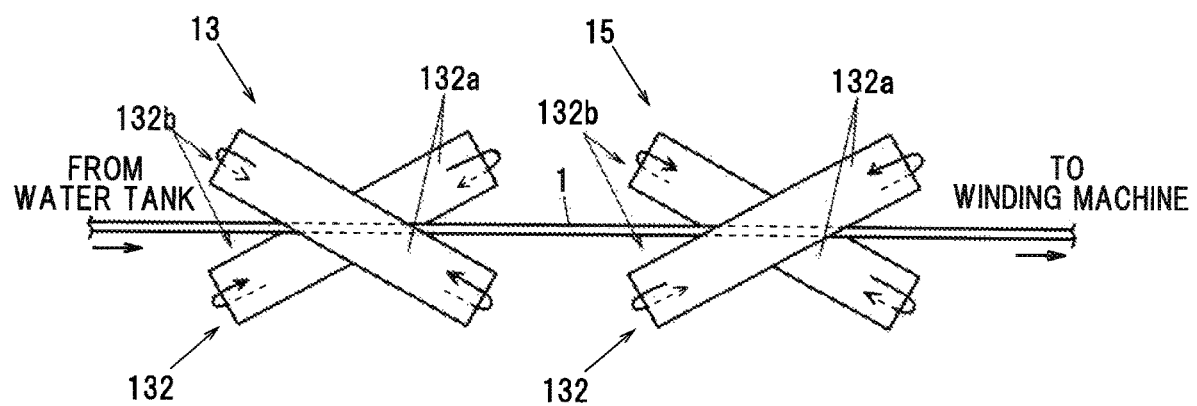
FIG. 6 is a diagram showing one modification to the pressure sensitive sensor producing device.

Further, as shown in FIG. 6, a second take-up machine 15 may be provided between the take-up machine 13 and the winding machine 14 to take up the pressure sensitive sensor 1 while rotating the pressure sensitive sensor 1 in the opposite rotation direction to the rotation direction of the take-up machine 13. This eliminates the need to rotate the bobbin 141 in the winding machine 14, and therefore eliminates the need to introduce equipment for rotating the bobbin 141. Further, by using the belt type take-up machine 132 as the take-up machine 13 and the second take-up machine 15, it is possible to omit the large-scale rotating equipment, while it is possible to enhance both the speed of rotating the pressure sensitive sensor 1 in the circumferential direction of the pressure sensitive sensor 1 and the speed of winding the pressure sensitive sensor 1 onto the bobbin 141, and it is therefore possible to enhance the producing speed of the pressure sensitive sensor 1 and thereby enhance the efficiency of mass production of the pressure sensitive sensor 1.

(Description of the Ribs 4)

Here, the reason for forming the plurality of ribs 4 of the cylindrical shape body 2 will be described. For example, when the cylindrical shape body 2 is being formed in a circular cylindrical shape with no rib 4, the stress in rotating the cylindrical shape body 2 (the stress in the torsion of the cylindrical shape body 2) in the circumferential direction with the take-up machine 13 is not evenly transmitted in the cylindrical shape body 2, leading to concern that collapse or the like of the hollow portion 2a of the cylindrical shape body 2 may occur, causing deformation of the cylindrical shape body 2 into an irregular shape. This is because the cylindrical shape body 2 immediately after being ejected from the head 111 of the extruding machine 11 is low in rigidity and is in an easily deformable state.

In light of the foregoing, in the present embodiment, the plurality of ribs 4 are being formed on the outer peripheral surface 2c of the cylindrical shape body 2 so that the cylindrical shape body 2 can be subjected to the torsion without its hollow portion 2a being collapsed. As a result, in the cylindrical shape body 2, the stress in the torsion of the cylindrical shape body 2 is concentrated in the portions thin in thickness (the portions between adjacent ribs 4 of the plurality of ribs 4 in the circumferential direction of the pressure sensitive sensor 1), and therefore the cylindrical shape body 2 can be subjected to the torsion while maintaining the shape of its hollow portion 2a.

Figure 7A:
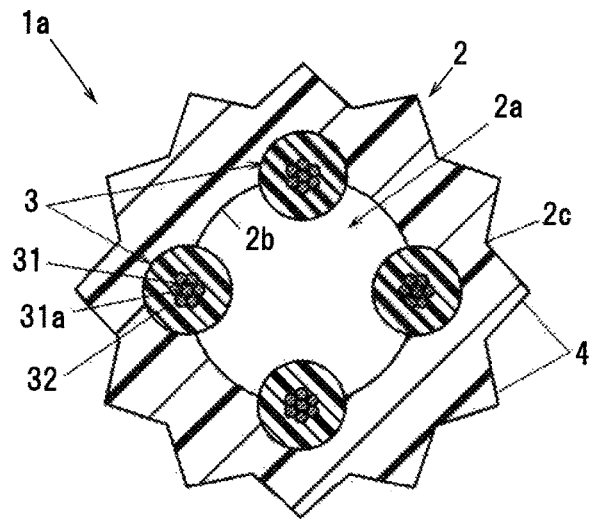
FIG. 7A is a cross-sectional view showing a cross section perpendicular to the longitudinal direction of a pressure sensitive sensor according to one modification to the present invention.
Figure 7B:
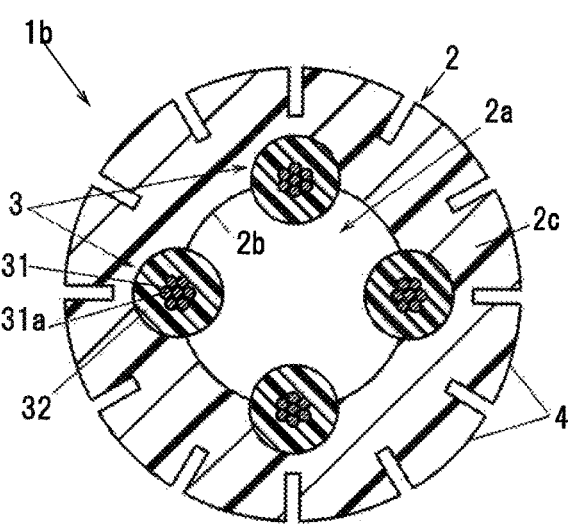
FIG. 7B is a cross-sectional view showing a cross section perpendicular to the longitudinal direction of a pressure sensitive sensor according to one modification to the present invention.

The shapes of the plurality of ribs 4 of the cylindrical shape body 2 are not particularly limited, but may be configured to be such a shape as to be easily deformed when the cylindrical shape body 2 is subjected to the torsion. For example, as in a pressure sensitive sensor 1a as shown in FIG. 7A, the plurality of ribs 4 of its cylindrical shape body 2 may be configured to be of a triangular shape in the cross-sectional view, or as in a pressure sensitive sensor 1b as shown in FIG. 7B, the plurality of ribs 4 of its cylindrical shape body 2 may be configured to be of a fan shape in the cross-sectional view. The shapes of the plurality of ribs 4 of the cylindrical shape body 2 can be altered by altering the shapes of the plurality of grooves 112a of the die 112 to be used in the head 111 of the extruding machine 11. In this manner, the shapes of the plurality of ribs 4 of the cylindrical shape body 2 can be configured as appropriate, but it can be said that it is more preferable that the shapes of the plurality of ribs 4 of the cylindrical shape body 2 are configured to be a semicircular shape so that, in molding the cylindrical shape body 2, the resin easily flows within the plurality of grooves 112a of the die 112.

Figure 8A:
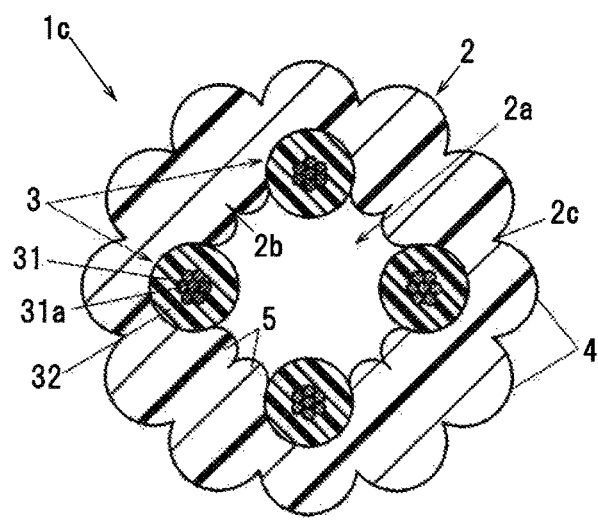
FIG. 8A is a cross-sectional view showing a cross section perpendicular to the longitudinal direction of a pressure sensitive sensor according to one modification to the present invention.
Figure 8B:
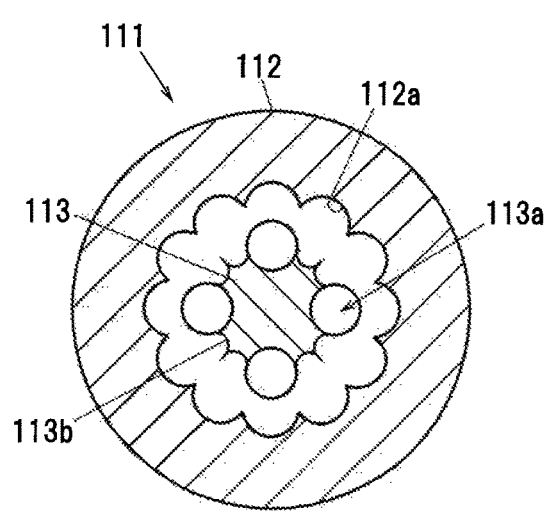
FIG. 8B is a cross-sectional view showing a die and a mandrel used in producing the pressure sensitive sensor of FIG. 8A.

Further, as in a pressure sensitive sensor 1c as shown in FIG. 8A, in addition to the plurality of ribs 4 formed on the outer peripheral surface 2c of the cylindrical shape body 2, a plurality of ribs 5 may be formed also on the inner peripheral surface 2b of the cylindrical shape body 2. This makes the torsion of the cylindrical shape body 2 easier, and therefore makes it possible to further suppress the occurrence of a failure such as the collapse or the like of the hollow portion 2a when the hollow portion 2a is subjected to the torsion with the take-up machine 13. In this case, as shown in FIG. 8B, by forming a plurality of grooves 113b on an outer peripheral surface of an ejecting side end portion of the mandrel 113 in the extruding machine 11, it is possible to form the plurality of ribs 5 on the inner peripheral surface 2b of the cylindrical shape body 2.

(Pressure Sensitive Sensor Producing Method)

A pressure sensitive sensor producing method according to the present embodiment is a method of producing the pressure sensitive sensor 1 using the pressure sensitive sensor producing device 10 described above. In producing the pressure sensitive sensor 1, first, the four electrode wires 3 are formed by coating the peripheries of the respective conductors 31 with the respective elastic electrical conducting members 32. After that, the formed four electrode wires 3 are fed out to the head 111 in the extruding machine 11, in which the cylindrical shape body 2 is extrusion molded while the four electrode wires 3 are being run into the head 111 in such a manner that a periphery of the four electrode wires 3 is coated with the cylindrical shape body 2 with the extruding machine 11.

At this point of time, the take-up machine 13 is operated to take up the cylindrical shape body 2 and the four electrode wires 3 ejected from the extruding machine 11 while rotating the cylindrical shape body 2 and the four electrode wires 3 in the circumferential direction of the pressure sensitive sensor 1. For example, when the capstan type take-up machine 131 is used, the taking up of the cylindrical shape body 2 and the four electrode wires 3 is performed by the capstan type take-up machine 131, while rotating the capstan type take-up machine 131 in the circumferential direction of the pressure sensitive sensor 1 to be introduced into the capstan type take-up machine 131. Alternatively, when the belt type take-up machine 132 is used, the taking up of the cylindrical shape body 2 and the four electrode wires 3 is performed by arranging the one pair of belt rotating mechanisms 132b in such a manner as to allow the rotating directions of the upper and lower ring shape belts 132a in the one pair of belt rotating mechanisms 132b to intersect with each other, to thereby take up the pressure sensitive sensor 1 while rotating the pressure sensitive sensor 1 in the circumferential direction of the pressure sensitive sensor 1. This allows the torsion of the cylindrical shape body 2 immediately after the ejection of the cylindrical shape body 2 from the extruding machine 11, and the helical shape arrangement of the four electrode wires 3.

The cylindrical shape body 2 remaining in the torsional state is introduced into the water tank 12, where the cylindrical shape body 2 is cooled and solidified while remaining in the torsional state. This results in the pressure sensitive sensor 1 with the four electrode wires 3 arranged in the helical shape therein. The pressure sensitive sensor 1 guided out from the water tank 12 is taken up by the take-up machine 13, and subsequently is wound by the winding machine 14 onto the bobbin 141.

Modifications

Figure 9:
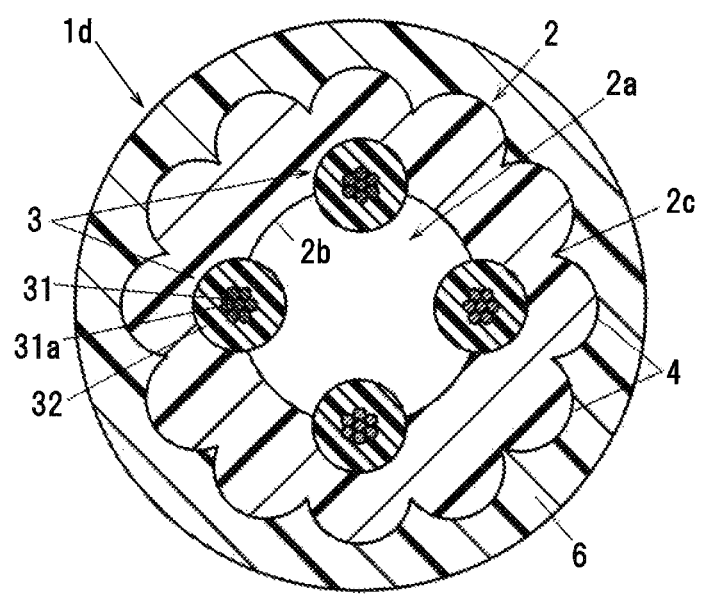
FIG. 9 is a cross-sectional view showing a cross section perpendicular to the longitudinal direction of a pressure sensitive sensor according to one modification to the present invention.

FIG. 9 is a cross-sectional view showing a cross section perpendicular to the longitudinal direction of a pressure sensitive sensor 1d according to one modification to the present invention. The pressure sensitive sensor 1d may be configured in such a manner as to be further provided with a protective layer 6 made of an elastic material on the outer peripheral surface of the cylindrical shape body 2 in the pressure sensitive sensor 1 of FIGS. 1A and 1B. The protective layer 6 is being formed in such a manner that its outer peripheral surface is of a circular shape in the cross-sectional view perpendicular to the longitudinal direction of the pressure sensitive sensor 1d. The protective layer 6 is a member that acts to make the strength of the pressure sensitive sensor 1d high, make the outer shape of the pressure sensitive sensor 1d circular, and to make high the strength of the adhesion to another member such as a sealing member for sealing the terminal of the pressure sensitive sensor 1d, or an attaching member for attaching the pressure sensitive sensor 1d, or the like. For the protective layer 6, it is possible to use, for example, a member made of a thermoplastic polyurethane or the like which is excellent in strength and abrasion resistance, and high in the strength of the adhesion to a polyamide which is often used in another member such as a sealing member or the like. The protective layer 6 can be formed by, for example, performing extrusion molding on the outer peripheral surface of the pressure sensitive sensor 1 of FIGS. 1A and 1B.

Actions and Advantageous Effects of the Embodiment

As described above, in the pressure sensitive sensor producing method according to the present embodiment, the four electrode wires 3 are being arranged in the helical shape by taking up the cylindrical shape body 2 and the four electrode wires 3 ejected from the extruding machine 11 while rotating the cylindrical shape body 2 and the four electrode wires 3 in the circumferential direction of the pressure sensitive sensor 1.

In the conventional method using a spacer (a dummy wire), the step of producing the spacer and the step of removing the spacer after extrusion molding are indispensable, leading to the production being time-consuming. In addition, in the conventional method, since there is concern that, during the pulling and removing of the spacer, the fracture of the spacer may occur, or damage to the electrode wires may occur, it is necessary to cut the spacer and the electrode wires to a short length before the pulling and removing of the spacer, leading to difficulty in producing the long length pressure sensitive sensor. Further, in order to make it easy to remove the spacer, it is necessary to use a highly slidable and expensive fluorine-based resin or the like in the spacer, but because the spacer is cut to a short length, the spacer cannot be reused, leading to an increase in cost.

According to the present embodiment, since the pressure sensitive sensor 1 can be produced without using the spacer, the production of the pressure sensitive sensor 1 is facilitated, and the production cost of the pressure sensitive sensor 1 can therefore be greatly reduced. Further, in the present invention, since no spacer is used, the length of the pressure sensitive sensor 1 is not restricted, and the long length pressure sensitive sensor 1 of, for example, several tens of meters, can be easily produced.

Summary of the Embodiment

Next, the technical ideas grasped from the above-described embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A pressure sensitive sensor producing method, which is configured to produce a pressure sensitive sensor (1) composed of a cylindrical shape body (2) including therein a hollow portion (2a) along a longitudinal direction of the pressure sensitive sensor (1), and being made of an elastic electrical insulating member, and a plurality of electrode wires (3) arranged in a helical shape along an inner peripheral surface (2b) of the cylindrical shape body (2) and arranged in such a manner as to have no contact with each other, the method comprising: with an extruding machine (11) with a head (111), extrusion molding the cylindrical shape body (2) while running the plurality of electrode wires (3) into that head (111) in such a manner that a periphery of the plurality of electrode wires (3) is coated with the cylindrical shape body (2); and taking up the cylindrical shape body (2) and the plurality of electrode wires (3) ejected from the extruding machine (11) while rotating the cylindrical shape body (2) and the plurality of electrode wires (3) in a circumferential direction of the pressure sensitive sensor (1), to thereby arrange the plurality of electrode wires (3) into the helical shape.

[2] The pressure sensitive sensor producing method as defined in [1] above, wherein the cylindrical shape body (2) of the pressure sensitive sensor (1) is extrusion molded by the elastic electrical insulating member being passed through a space (114) formed between a die (112) of the head (111) and a mandrel (113) in the extruding machine (11), while an outer peripheral surface (2c) of the cylindrical shape body (2) of the pressure sensitive sensor (1) is formed with a plurality of ribs (4) thereon, by an inner peripheral surface of an ejecting side end portion of the die (112) being formed with a plurality of grooves (112a) thereon.

[3] The pressure sensitive sensor producing method as defined in the above [2], wherein the plurality of grooves (112a) are being formed parallel to an extrusion direction.

[4] The pressure sensitive sensor producing method as defined in the above [2], wherein the plurality of grooves (112a) are being formed in such a manner as to be inclined with respect to the extrusion direction.

[5] The pressure sensitive sensor producing method as defined in any one of the above [2] to [4], wherein the inner peripheral surface (2b) of the cylindrical shape body (2) of the pressure sensitive sensor (1) is formed with a plurality of ribs (5) thereon, by an outer peripheral surface of an ejecting side end portion of the mandrel (113) being formed with a plurality of grooves (113b) thereon.

[6] The pressure sensitive sensor producing method as defined in any one of the above [1] to [5], wherein the taking up of the cylindrical shape body (2) and the plurality of electrode wires (3) is performed by using a capstan type take-up machine (131) including therein a plurality of capstans (131a) to be wound with the pressure sensitive sensor (1) and be rotated to thereby take up the pressure sensitive sensor (1), and by taking up the pressure sensitive sensor (1) with the capstan type take-up machine (131) while rotating the capstan type take-up machine (131) in the circumferential direction of the pressure sensitive sensor (1) to be introduced into the capstan type take-up machine (131).

[7] The pressure sensitive sensor producing method as defined in any one of the above [1] to [5], wherein the taking up of the cylindrical shape body (2) and the plurality of electrode wires (3) is performed by using a belt type take-up machine (132) including therein one pair of belt rotating mechanisms (132b) with upper and lower ring shape belts (132a) to be rotationally driven therein, to sandwich the pressure sensitive sensor (1) between the upper and lower ring shape belts (132a) with the one pair of belt rotating mechanisms (132b), rotate the upper and lower ring shape belts (132a) of the one pair of belt rotating mechanisms (132b) and thereby take up the pressure sensitive sensor (1), and by arranging the one pair of belt rotating mechanisms (132b) in such a manner as to allow rotating directions of the upper and lower ring shape belts (132a) in the one pair of belt rotating mechanisms (132b) to intersect with each other, to thereby take up the pressure sensitive sensor (1) while rotating the pressure sensitive sensor (1) in the circumferential direction of the pressure sensitive sensor (1).

[8] The pressure sensitive sensor producing method as defined in any one of the above [1] to [7], wherein, between a first take-up machine (13) configured to take up the pressure sensitive sensor (1) while rotating the pressure sensitive sensor (1) in one circumferential direction of two opposite circumferential directions of the pressure sensitive sensor (1), and a winding machine (14) configured to wind the pressure sensitive sensor (1), there is provided a second take-up machine (15) configured to take up the pressure sensitive sensor (1) while rotating the pressure sensitive sensor (1) in an other circumferential direction of the two opposite circumferential directions of the pressure sensitive sensor (1).

[9] A pressure sensitive sensor producing device, which is configured to produce a pressure sensitive sensor (1) composed of a cylindrical shape body (2) including therein a hollow portion (2a) along a longitudinal direction of the pressure sensitive sensor (1), and being made of an elastic electrical insulating member, and a plurality of electrode wires (3) arranged in a helical shape along an inner peripheral surface of the cylindrical shape body (2) and arranged in such a manner as to have no contact with each other, the device comprising: an extruding machine (11) with a head (111) configured to extrusion mold the cylindrical shape body (2) while running the plurality of electrode wires (3) into that head (111) in such a manner that a periphery of the plurality of electrode wires (3) is coated with the cylindrical shape body (2); and a take-up machine (13) configured to take up the cylindrical shape body (2) and the plurality of electrode wires (3) ejected from the extruding machine (11) while rotating the cylindrical shape body (2) and the plurality of electrode wires (3) in a circumferential direction of the pressure sensitive sensor (1).

Although the embodiments of the present invention have been described above, the above described embodiments are not to be construed as limiting the inventions according to the appended claims. Further, it should be noted that not all the combinations of the features described in the embodiments are indispensable to the means for solving the problem of the invention.

Further, the present invention can appropriately be modified and implemented without departing from the spirit thereof. For example, although the case in which the cylindrical shape body 2 is cooled with the water tank 12 has been described in the above embodiments, the present invention is not limited to this, but may be configured in such a manner that, for example, the water tank 12 may be omitted and the cylindrical shape body 2 may be cooled by air cooling or natural cooling.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A pressure sensitive sensor producing method, which is configured to produce a pressure sensitive sensor composed of a cylindrical shape body including therein a hollow portion along a longitudinal direction of the pressure sensitive sensor, and being made of an elastic electrical insulating member, and a plurality of electrode wires arranged in a helical shape along an inner peripheral surface of the cylindrical shape body and arranged in such a manner as to have no contact with each other, the method comprising:

with an extruding machine with a head, extrusion molding the cylindrical shape body while running the plurality of electrode wires into that head in such a manner that a periphery of the plurality of electrode wires is coated with the cylindrical shape body; and at a downstream of the extruding machine, taking up the cylindrical shape body and the plurality of electrode wires ejected from the extruding machine while rotating the cylindrical shape body and the plurality of electrode wires in a circumferential direction of the pressure sensitive sensor, to thereby arrange the plurality of electrode wires into the helical shape, wherein, taking up of the cylindrical shape body and the plurality of electrode wires is performed by using a belt type take-up machine including therein one pair of belt rotating mechanisms with upper and lower ring shape belts to be rotationally driven therein, to sandwich the pressure sensitive sensor between the upper and lower ring shape belts with the one pair of belt rotating mechanisms, rotate the upper and lower ring shape belts of the one pair of belt rotating mechanisms and thereby take up the pressure sensitive sensor, and by arranging the one pair of belt rotating mechanisms in such a manner as to allow rotating directions of the upper and lower ring shape belts in the one pair of belt rotating mechanisms to intersect with each other, to thereby take up the pressure sensitive sensor while rotating the pressure sensitive sensor in the circumferential direction of the pressure sensitive sensor.

2. The pressure sensitive sensor producing method according to claim 1, wherein the cylindrical shape body of the pressure sensitive sensor is extrusion molded by the elastic electrical insulating member being passed through a space formed between a die of the head and a mandrel in the extruding machine, while an outer peripheral surface of the cylindrical shape body of the pressure sensitive sensor is formed with a plurality of ribs thereon, by an inner peripheral surface of an ejecting side end portion of the die being formed with a plurality of grooves thereon.

3. The pressure sensitive sensor producing method according to claim 2, wherein the plurality of grooves are being formed parallel to an extrusion direction.

4. The pressure sensitive sensor producing method according to claim 2, wherein the plurality of grooves are being formed in such a manner as to be inclined with respect to the extrusion direction.

5. The pressure sensitive sensor producing method according to claim 2, wherein the inner peripheral surface of the cylindrical shape body of the pressure sensitive sensor is formed with a plurality of ribs thereon, by an outer peripheral surface of an ejecting side end portion of the mandrel being formed with a plurality of grooves thereon.

6. The pressure sensitive sensor producing method according to claim 1, wherein the taking up of the cylindrical shape body and the plurality of electrode wires is performed by using a capstan type take-up machine including therein a plurality of capstans to be wound with the pressure sensitive sensor and be rotated to thereby take up the pressure sensitive sensor, and by taking up the pressure sensitive sensor with the capstan type take-up machine while rotating a whole of the capstan type take-up machine in the circumferential direction of the pressure sensitive sensor to be introduced into the capstan type take-up machine.

7. The pressure sensitive sensor producing method according to claim 1, wherein, between a first take-up machine configured to take up the pressure sensitive sensor while rotating the pressure sensitive sensor in one circumferential direction of two opposite circumferential directions of the pressure sensitive sensor, and a winding machine configured to wind the pressure sensitive sensor, there is provided a second take-up machine configured to take up the pressure sensitive sensor while rotating the pressure sensitive sensor in an other circumferential direction of the two opposite circumferential directions of the pressure sensitive sensor.

8. The pressure sensitive sensor producing method according to claim 1, wherein the rotating of the cylindrical shape body and the plurality of electrode wires is performed outside of the extruding machine.

9. A pressure sensitive sensor producing device, which is configured to produce a pressure sensitive sensor composed of a cylindrical shape body including therein a hollow portion along a longitudinal direction of the pressure sensitive sensor, and being made of an elastic electrical insulating member, and a plurality of electrode wires arranged in a helical shape along an inner peripheral surface of the cylindrical shape body and arranged in such a manner as to have no contact with each other, the device comprising:
    an extruding machine with a head configured to extrusion mold the cylindrical shape body while running the plurality of electrode wires into that head in such a manner that a periphery of the plurality of electrode wires is coated with the cylindrical shape body; and
    a take-up machine configured to, at a downstream of the extruding machine, take up the cylindrical shape body and the plurality of electrode wires ejected from the extruding machine while rotating the cylindrical shape body and the plurality of electrode wires in a circumferential direction of the pressure sensitive sensor,
    wherein,
    the take-up machine taking up of the cylindrical shape body and the plurality of electrode wires is performed by using a belt type take-up machine including therein one pair of belt rotating mechanisms with upper and lower ring shape belts to be rotationally driven therein.

10. The pressure sensitive sensor producing device according to claim 9,
    wherein the take-up machine comprises a belt type take-up machine, and
    wherein the belt type take-up machine includes a pair of belt rotating mechanisms with upper and lowerring shape belts to be rotationally driven therein, to sandwich the pressure sensitive sensor between the upper and lower ring shape belts with the one pair of belt rotating mechanisms, rotate the upper and lower ring shape belts of the pair of belt rotating mechanisms and thereby take up the pressure sensitive sensor.

11. The pressure sensitive sensor producing device according to claim 10,
    wherein the pair of belt rotating mechanisms are arranged in such a. manner as to allow rotating directions of the upper and lower ring shape belts in the pair of belt rotating mechanisms to intersect with each other.

12. The pressure sensitive sensor producing device according to claim 9, wherein the taking up of the cylindrical shape body and the plurality of electrode wires is performed by the belt type take-up machine, the belt type take-up machine including a pair of belt rotating mechanisms with upper and lower ring shape belts to be rotationally driven therein, to sandwich the pressure sensitive sensor between the upper and lower ring shape belts with the one pair of belt rotating mechanisms, rotate the upper and lower ring shape belts of the pair of belt rotating mechanisms and thereby take up the pressure sensitive sensor, and
    wherein the pair of belt rotating mechanisms are arranged in such a manner as to allow rotating directions of the upper and lower ring shape belts in the pair of belt rotating mechanisms to intersect with each other, to thereby take up the pressure sensitive sensor while rotating the pressure sensitive sensor in the circumferential direction of the pressure sensitive sensor.

13. The pressure sensitive sensor producing device according to claim 9, wherein the rotating of the cylindrical shape body and the plurality of electrode wires by the take-up machine is performed outside of the extruding machine.

14. A pressure sensitive sensor producing device, which is configured to produce a pressure sensitive sensor composed of a cylindrical shape body including therein a hollow portion along a longitudinal direction of the pressure sensitive sensor, and being made of an elastic electrical insulating member, and a plurality of electrode wires arranged in a helical shape along an inner peripheral surface of the cylindrical shape body and arranged in such a manner as to have no contact with each other, the device comprising:

an extruding machine with a head configured to extrusion mold the cylindrical shape body while running the plurality of electrode wires into that head in such a maturer that a periphery of the plurality of electrode wires is coated with the cylindrical shape body; and a take-up machine comprising one of a capstan type take-up machine and a belt type take-up machine configured to, after the cylindrical shape body and the plurality of electrode wires are ejected from the head of the extruding machine, take up the cylindrical shape body and the plurality of electrode wires ejected from the extruding machine while rotating the cylindrical shape body and the plurality of electrode wires in a circumferential direction of the pressure sensitive sensor.

15. The pressure sensitive sensor producing device according to claim 14, wherein the take-up machine comprises the capstan type take-up machine.

16. The pressure sensitive sensor producing device according to claim 14, wherein the belt type take-up machine includes a pair of belt rotating mechanisms with upper and lower ring shape belts to be rotationally driven therein, to sandwich the pressure sensitive sensor between the upper and lower ring shape belts with the one pair of belt rotating mechanisms, rotate the upper and lower ring shape belts of the pair of belt rotating mechanisms and thereby take up the pressure sensitive sensor.

17. The pressure sensitive sensor producing device according to claim 14, wherein the taking up of the cylindrical shape body and the plurality of electrode wires is performed by the belt type take-up machine, the belt type take-up machine including a pair of belt rotating mechanisms with upper and lower ring shape belts to be rotationally driven therein, to sandwich the pressure sensitive sensor between the upper and lower ring shape belts with the one pair of belt rotating mechanisms, rotate the upper and lower ring shape belts of the pair of belt rotating mechanisms and thereby take up the pressure sensitive sensor, and wherein the pair of belt rotating mechanisms are arranged in such a manner as to allow rotating directions of the upper and lower ring shape belts in the pair of belt rotating mechanisms to intersect with each other, to thereby take up the pressure sensitive sensor while rotating the pressure sensitive sensor in the circumferential direction of the pressure sensitive sensor.

18. The pressure sensitive sensor producing device according to claim 14, wherein the take-up machine comprises the belt type take-up machine including a pair of belt rotating mechanisms with upper and lower ring shape belts to be rotationally driven therein, and wherein the pair of belt rotating mechanisms are arranged in such a manner as to allow rotating directions of the upper and lower ring shape belts in the pair of belt rotating mechanisms to intersect with each other.

19. The pressure sensitive sensor producing device according to claim 14, wherein the rotating of the cylindrical shape body and the plurality of electrode wires by the take-up machine is performed outside of the extruding machine.

* * * * *